United States Patent [19]

Andersen

[11] 3,739,980
[45] June 19, 1973

[54] VENTILATION SYSTEM FOR STOREROOMS FOR ROOT CROPS AND SIMILAR PRODUCTS

[75] Inventor: Christian Karmark Andersen, Nastved, Denmark

[73] Assignee: Nordisk Ventilator Co. Aktieselskab, Naestved, Denmark

[22] Filed: Nov. 30, 1971

[21] Appl. No.: 203,301

[30] Foreign Application Priority Data
Dec. 2, 1970 Denmark ................................ 6147

[52] U.S. Cl. ......................... 236/49, 236/91, 98/52
[51] Int. Cl. .............................................. F24f 7/06
[58] Field of Search .................. 236/49, 91; 98/52; 165/16

[56] References Cited
UNITED STATES PATENTS
2,917,138   12/1959   Walsh ...................................... 98/52
2,290,985   7/1942    McElgin ............................... 236/91

Primary Examiner—William E. Wayner
Assistant Examiner—William E. Tapolccai, Jr.
Attorney—Richard C. Sughrue, Gideon Franklin Rothwell, Robert J. Seas, Jr. et al.

[57] ABSTRACT

A ventilation system for storerooms for root crops and similar products, in which the amount of air exhausted from and injected into the room is adjusted by means of a damper controlled by a hydraulic thermostat arrangement in dependence on the temperature in the room as well as the ambient temperature, said thermostat arrangement having two operative states, so that the injection of ambient air is blocked at ambient temperatures either below or above a certain value independent on the room temperature in order to obviate undesired heating or cooling of the products stored due to injection of fresh air.

4 Claims, 2 Drawing Figures

VENTILATION SYSTEM FOR STOREROOMS FOR ROOT CROPS AND SIMILAR PRODUCTS

BACKGROUND OF THE INVENTION

The present invention relates to ventilation systems for storerooms intended for agricultural products such as potatoes, beets, cabbages and other root crops or fruit.

While it was formerly customary to store potatoes, beets, cabbages and similar agricultural products in clamps, it is now more common to store them in suitably constructed storerooms. Considering the keeping qualities of the products, it is necessary to maintain a suitable form of ventilation in such storerooms as well as an appropriate temperature which must not be too high. For this reason, ventilation systems are frequently utilized which provide good possibilities for controlling the supply of fresh air and the exhaustion of air and, possibly, also a recirculation of a part of or the entire, exhausted volume of air, so that a possibility also exists for maintaining a constant air movement in the room independently of the supply of fresh air.

Since, as a rule, it is mainly a question of storing the products during the winter period, there will usually be no call for special cooling means.

In order to fulfill the storage temperature conditions for products of the kind mentioned the ventilation system is usually controlled by a thermostat influenced by the temperature in the room as well as the ambient temperature. The system has two operative states one in which the damper means forming part of the system is adjusted automatically in dependance on the temperature in the room so as to control the amount of air injected into and exhausted from the room, and the other in which said automatical adjustment is substantially blocked and a recirculation of the air in the room with substantially no supply of fresh air is established. The reason for using such a control device is that the sole automatical control in dependance on inside temperature will not always be satisfactory. Thus, due to the automatic adjustment in case of relatively high ambient temperatures a supply of fresh air may result in a heating of the products stored instead of the cooling effect desired which might be harmful to the products. By using a thermostat of the kind mentioned, this thermostat will in such cases, at ambient temperatures above a predetermined value assume, said second operative state, in which it is ensured that a harmful supply of heat to the room from the ambient environment does not take place. As a result hereof the rise of the inside temperature to a level, at which harmful effects will occur, will be delayed and since it could usually be expected that the ambient temperature will only assume the above-mentioned high level in a substantially shorter period of time, the normal control in dependance on inside temperature will, in most cases, be restored before harmful heating has taken place. Under climatic conditions at which this cannot be achieved, it might be necessary to utilize special cooling means.

On the other hand, it might also occur that temperatures too low are harmful to the products and in such cases the above-mentioned thermostat can be constructed to assume the said second state at ambient temperatures below a predetermined value, which will, in a similar way, result in a delay of the decrease of inside temperature to a harmful level. Under climatic conditions at which this cannot be achieved it might be necessary to employ special heating means.

A known ventilation system of the kind referred to comprises an adjustable damper mechanism which is operated by an electromotor controlled by a complicated electrical circuit the operation of which depends on the inside as well as the ambient temperature.

SUMMARY OF THE INVENTION

The invention has for its object to provide a more simple and reliable control of the adjustment of the damper mechanism in a ventilation system of the kind referred to.

According to the invention a ventilation system for storerooms for root crops and similar products is provided, which comprises A fan means for exhausting air from the room and injecting fresh air into the room;

a damper mechanism for adjusting the amount of exhausted and injected air and being able to provide recirculation of at least a part of the exhausted air;

a driving means for operating said damper mechanism;

a hydraulic thermostat for controlling in a first state the operation of said driving means in dependance on the temperature in the room and maintaining in a second state said damper mechanism in a substantially closed condition, in which injection of fresh air is substantially prevented and recirculation of the exhausted air is established;

a fluid chamber in said hydraulic thermostat;

a change-over piston mounted in said fluid chamber to be displaceable between two positions defining a first fluid volume in said chamber corresponding to said first state of the thermostat and a second fluid volume corresponding to said second state of the thermostat, respectively; and an external temperature sensor for controlling the position of said change-over piston in dependance on ambient temperature;

whereby the change-over piston controlled by said sensor assumes one of said positions at ambient temperature below a predetermined value and the other position at ambient temperatures above said value.

The use of a hydraulic thermostat in a ventilation system of the kind mentioned may, beyond the simplicity and reliability obtainable with such a control system, results in the particular advantage that adjustment of the damper mechanism is not prevented in case of interruptions in the supply of electrical power although the fan incorporated in the system will be stopped in case of such power interruptions since it is normally driven by an electromotor. It may be ensured by using an appropriate temperature sensor for the damper that the damper mechanism will be closed in case of, for example, too high ambient temperatures, so that the risk of harmful effects caused by a power interruption will be materially reduced.

As an example, a system of the kind referred to may be used for ventilating a potato storeroom.

In such storerooms, in which potatoes are to be stored during the winter period, a low temperature should prevail, but this temperature must not be lower than 3° C, and it would have a harmful effect if the temperature exceeds 12° C.

As a rule, the room should be sufficiently insulated so as to prevent the temperature, in the prevailing climatic conditions, from dropping below the said lowest temperature and the room is provided with a ventilation system serving, on the one hand, to ensure a requisite replenishment of air and, on the other hand, to counteract by drawing cold, ambient air into the room, a rise in temperature due to a generation of heat stemming from the potatoes.

For this reason, the ventilation system is constructed for automatic control of an injection damper by means of a hydraulic thermostat which opens and closes the injection damper in dependance upon the temperature prevailing inside the storeroom.

By way of example, the thermostat may have a control interval of 2° C to both sides of a mean value which, in the case of storing potatoes, might be adjusted to 6° C, whereby the injection damper will be completely closed at 4° C and fully open at 8° C.

During the greater part of the storing period the ambient temperature will be sufficiently low for the injection of outer air to result in a temperature drop inside the storeroom and it is possible, therefore, by means of the above-mentioned control, to maintain the room temperature within the required limits, since it is assumed that the storeroom is adequately insulated so that the loss of heat occurring when the injection damper is closed does not exceed the generation of heat.

However, if the ambient temperature happens to rise above the maximum temperature of the control interval, the injection of ambient air will no longer result in a cooling effect but, on the contrary, it will entail a heating effect which, however, in the system according to the invention, is obviated owing to the fact that the external temperature sensor causes the injection damper to be closed independently of the temperature inside the storeroom.

In this case, it is possible to adjust the external temperature sensor to an operating temperature of, for example 6° C, whereby it will be impossible for ambient air exceeding a temperature of 6° C to be drawn into the room irrespective of the temperature prevailing therein.

As another illustrative example of utilizing the invention, is when it is desired to maintain the temperature in a room, wherein a certain generation of heat takes place within a certain interval and where it has to be ensured that the temperature in any case does not drop below a certain low value.

When the ambient temperature is within a certain interval, it is possible, by means of the normal control of the damper, to maintain the storeroom temperature within the desired interval, whereas it will be necessary to add heat, when the ambient temperature is too low because of the loss of heat through the walls of the storeroom, if a drop of the temperature of the storeroom below the said deleterious low value is to be prevented.

However, provided that the ambient, very low temperature does not last too long, it is possible to achieve the same result by utilizing the invention without supplying additional heat by rendering the automatic control of the damper mechanism inoperative at a certain low external temperature independent of the temperature existing inside the storeroom at that particular moment.

In this case, the intake of fresh air will cease immediately, so that the storeroom temperature will, in the beginning, increase by a certain amount, whereby a volume of heat will be accumulated which, in a certain period of time, will be capable of compensating for the loss of heat through the walls of the building, so that there will be a possibility for the ambient temperature to rise before the room temperature drops to the deleteriously low value.

In particular, this application of the invention will be important under conditions where harmful cooling might be caused by the rapid great temperature drops sometimes occuring at night. In such cases the drop of the ambient temperature to the low value at which the automatic control is rendered inoperative will, as a rule, occur so rapidly that the temperature prevailing inside the storeroom will remain at a level, at which the injection of fresh air would continue unimpededly. However, the immediate cease of the injection of fresh air in accordance with the invention will make it possible to accumulate a sufficiently large volume of heat for the temperature to remain above the deleteriously low value until the ambient temperature begins to rise again at dawn.

In the above-mentioned example of storing potatoes, it can be assumed, as an example, that the insulation is sufficient for maintaining, by means of the normal control, the desired temperature inside the storeroom at ambient temperatures down to −15° C over a long period of time while, at a lower temperature, the risk may exist that the cooling effect becomes excessive. In this case, the external temperature sensor may, for example, then be adjusted to an operating temperature of −15° C, so that the injection damper will be immediately closed at this temperature, even if the temperature inside the storeroom, at this particular moment, is in excess of the lowest temperature, so that the automatic regulation would cause the injection damper to be slightly open and the injection of cold ambient air will likewise be prevented as long as the temperature thereof remains below −15° C, even if a rise in temperature should occur inside the storeroom due to generation of heat in the potatoes. Thus, a certain accumulation of heat is obtained which may prevent the temperature inside the storeroom from dropping so low as to have a deleterious effect, provided that the ambient temperature does not remain at the low value for too long periods of time.

BRIEF DESCRIPTION OF THE DRAWINGS

In the following, the invention will be explained in greater detail with reference to the accompanying drawings, in which.

DETAILED DESCRIPTION

Figure 1:
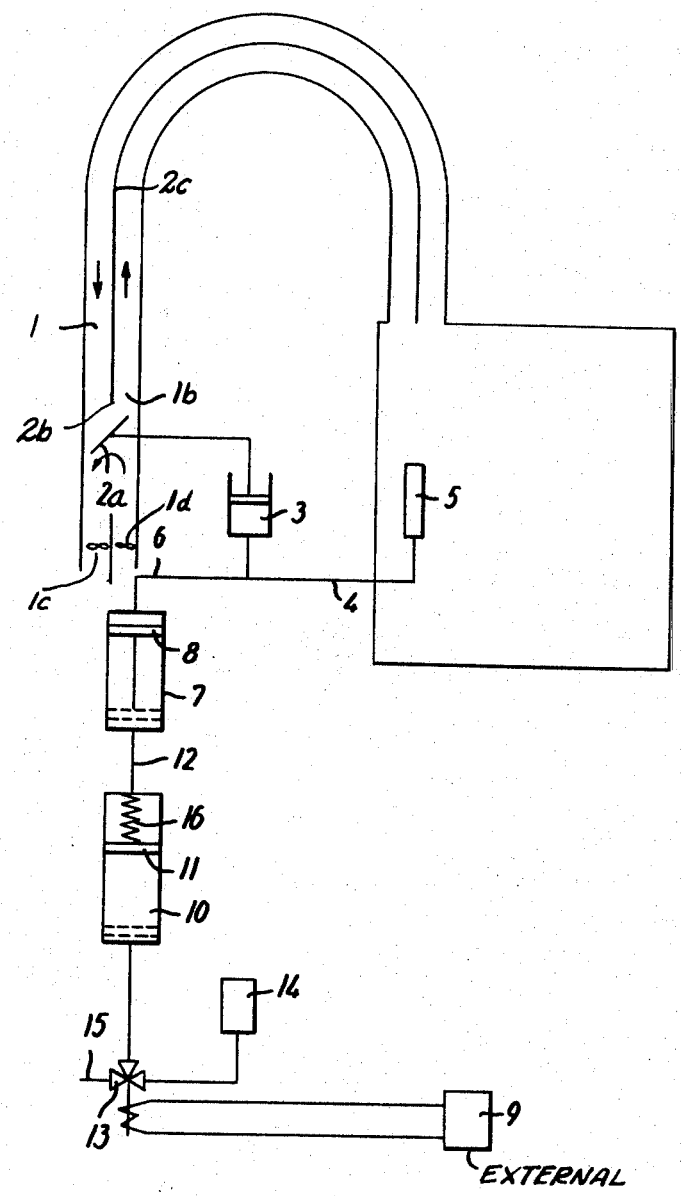
FIG. 1 is a diagrammatical view of a ventilation system according to the invention.

FIG. 1 shows a purely diagrammatical way a ventilation system comprising ventilation ducts 1a and 1b for injecting air into and exhausting air from a store room by means of fans 1c and 1d, respectively, said fans being illustrated only in a symbolical way. A damper 2a is arranged in an opening 2b in a common partition 2c between ducts 1a and 1b and is operated by means of a hydraulic motor 3 which is connected through a capillary tube 4 to a temperature sensor 5, so that damper 2a may be adjusted automatically to any position between two extreme positions in one of which opening 2a in partition 2b is closed and full supply of fresh air takes place through injection duct 1a, and in the other of which extreme positions both ducts 1a and 1b are blocked and full recirculation of the exhausted air takes place through opening 2b.

Sensor 5 is located inside the room to be ventilated and, as a result thereof, the hydraulic motor will adjust the position of damper 2a in dependence on the temperature prevailing inside the store room, so that ventilation ducts 1a and 1b are blocked, for example, at a certain low temperature and fully opened to the ambient air at a certain higher temperature, in which latter situation opening 2b is completely closed. A ventilation system of this general configuration is described in U.S. Pat. No. 3,487,767, S. H. Kristiansen.

The hydraulic thermostat consisting of components 3, 4 and 5 may be constructed in any known way. Thus, an adjusting cylinder having an adjustable fluid volume may be incorporated for adjusting the control interval of the thermostat. Moreover, it is possible to dispense with the separate sensor 5 when the hydraulic drive motor is constructed in such a way that its cylinder operates simultaneously as a temperature sensor such as described, for instance, in U.S. Pat. No. 3,599,865 to S. H. Kristiansen.

The control mechanism described thus operates in such a way that a rise of temperature inside the room causes damper 2 to open further so that more fresh air is drawn in from the ambient. If the ambient temperature is too high, an increased injection of fresh air would, however, result in an additional rise in temperature inside the storeroom which may, in many cases, have a harmful effect. This is obviated by utilizing the invention.

According to the invention, the hydraulic thermostat consisting of components 3, 4 and 5 is connected through a capillary tube 6 to a fluid chamber which, in this case, is constituted by a change-over cylinder 7 provided with a change-over piston 8. This piston 8 is able to assume two positions, that is to say, the one shown in solid lines in FIG. 1 in which the volume of fluid in cylinder 7 is reduced to a minimum value close to 0, as well as the one shown in dotted lines, in which the volume of fluid in cylinder 7 has a maximum value.

When piston 8 assumes the first position, the hydraulic thermostat operates in a normal manner so that the position of damper 2a is adjusted in dependance upon the temperature inside the storeroom. When, on the other hand, the piston assumes the position shown in dotted lines, a portion of the fluid content in the hydraulic thermostat is diverted to cylinder 7, whereby an effect is produced corresponding to a sharp drop in temperature inside the room so that damper 2a blocks ventilation ducts 1a and 1b independently of the temperature in the room.

The change-over piston 8 is controlled by an external temperature sensor 9, in such a way, for example, that piston 8 assumes the position shown in solid lines at ambient temperatures lower than a predetermined value, and assumes the position shown in dotted lines, at ambient temperatures above said value. Thus ventilation ducts 1a and 1b, are blocked completely when the ambient temperature exceeds a value, at which a harmful heating effect is produced inside the storeroom by the injection of fresh air. As soon as the ambient temperature drops below this value, piston 8 reassumes the position shown in solid lines and the hydraulic thermostat operates in a normal manner so as to adjust the position of damper 2a automatically in dependance on the temperature inside the storeroom.

In the embodiment illustrated, the adjustment of piston 8 is effected by means of a compressed air cylinder 10 provided with a plunger 11 which is connected by a rod 12 to piston 8. Cylinder 10 can be connected through a change-over valve 13 either to a compressed air source 14 or to an exhaust pipe 15. In FIG. 1 valve 13 is shown as an electromagnetic valve which is controlled by the external sensor 9 which may be an electrical sensor such as a bimetallic sensor or a thermistor connected in the control circuit of valve 13.

However, in order to obtain the particular advantage mentioned in the foregoing that the operation of the damper is not influenced by electrical power interruptions valve 13 may also be a mechanical or hydraulic valve controlled by an appropriate temperature sensor suitable for this purpose.

Under normal operating conditions, cylinder 10 and compressed air source 14 communicate freely so that plunger 11 is pressed upwards and piston 8 assumes the position shown in solid lines. When the ambient temperature exceeds the stated value, sensor 9 will readjust valve 13 in such a way that the compressed air source 14 is blocked and cylinder 10 is opened to exhaust pipe 15, whereby plunger 11 is pressed downwards by means of a spring 16 and piston 8 assumes the position shown in dotted lines.

It possible to employ the same mechanism for the purpose of counteracting a too drastic cooling effect due to a sharp drop in ambient temperature by adopting valve 13, in this case, to establish the communication between cylinder 10 and exhaust pipe 15 when the ambient temperature drops below a certain value. It is achieved thereby that damper is closed completely at ambient temperatures below the given value, even in the storeroom has not yet been cooled to such a degree that the damper, at this moment, is closed completely by means of the automatic temperature control. In this way, it is possible to accumulate a certain volume of heat and, thereby, delay the cooling of the storeroom, as a result of which a good chance will exist of a new rise in the ambient temperature before the temperature inside the room has reached a harmfully low value.

These two features can be utilized concurrently without difficulty by employing two external temperature sensors.

Figure 2:
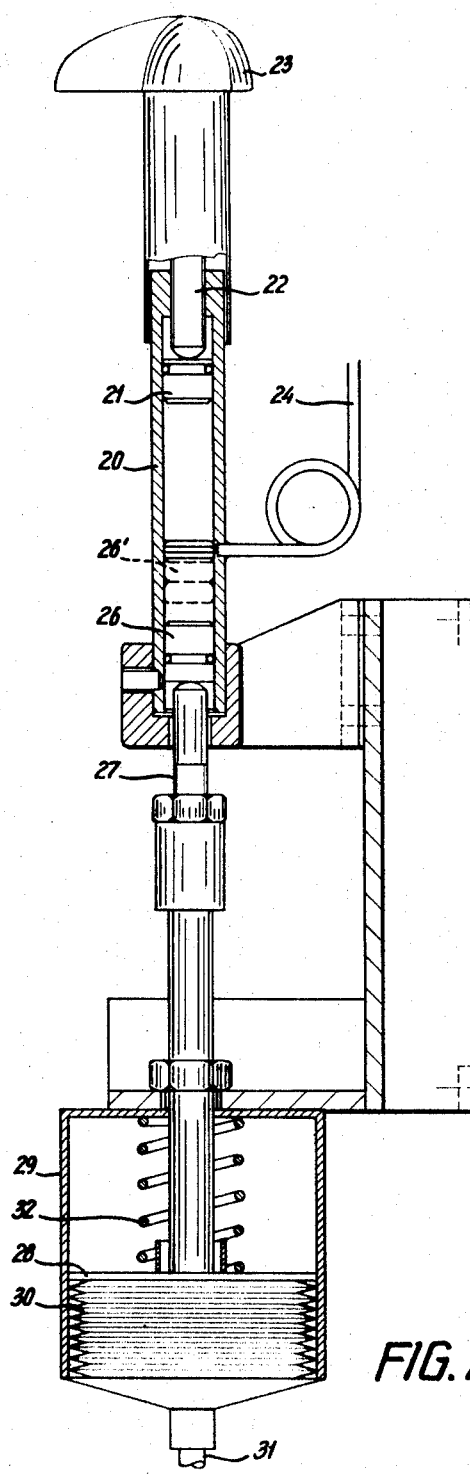
FIG. 2 shows a detail of the system.

FIG. 2 shows a special embodiment of the change-over section of the ventilation system according to the invention.

The change-over section shown in FIG. 2 incorporates an adjusting cylinder 20 having an adjusting piston 21 which is displaceable inside the cylinder by means of a screw 22 provided with a handle 23. Cylinder 20 is connected to the hydraulic thermostat through a capillary tube 24. By operating the adjusting piston 21, the content of fluid in the thermostat is regulated, whereby it is possible to make an adjustment of the mean temperature in the control interval.

Such an adjusting mechanism is known *per se* but, in contrast to prior art adjusting cylinders, having stationary bottoms so that the volume of fluid is determined solely by the position of the adjusting piston, the bottom of the adjusting cylinder 20 is constituted by a change-over piston 26, so that adjusting cylinder 20 at the same time accommodates the fluid chamber mentioned in the foregoing.

Change-over piston 26 is connected by a piston rod 27 of adjustable length to a plunger 28 inside a compressed air container 29, in which the sealing of the plunger is effected by means of a bellows 30. The interior of the bellows communicates with an inlet pipe 31 which is connected to a valve similar to valve 13 mentioned in the foregoing. Plunger 28 is maintained, by means of a spring 32, in a position corresponding to the position of the change-over piston 26 shown in solid lines. When compressed air is fed into the bellows 30, plunger 28 is pressed against the force exerted by spring 32 so that change-over piston 26 is moved into the position 26' shown in dotted lines.

Under the normal temperature control conditions, bellows 30 is connected with compressed air so that the piston assumes position 26' in which it forms the bottom of adjusting cylinder 20, the fluid volume therein being, in this state, adjusted by means of the adjusting piston 21 to the desired mean temperature in the control interval.

When communication between the bellows and the ambient air is established by means of the said valve so that piston 26 moves into the position shown in solid lines, the volume of fluid in adjusting cylinder 20 is increased and the volume of fluid in the hydraulic thermostat thereby drastically reduced to such an extent that the damper is closed completely irrespective of the temperature inside the storeroom.

It is also possible for the change-over section to be constructed in connection with the drive motor 3 of FIG. 1, irrespective of the construction thereof provided that said motor is constructed with a space in which room is present for introducing the adjusting piston, so that the effective fluid space can be modified thereby in the manner described above.

Instead of being controlled by compressed air as shown in FIG. 2, the adjusting piston may be controlled by hydraulic, electromagnetic or mechanical means, it being only necessary, in each individual case, to ensure that the control mechanism is capable of assuming only two positions, i.e. corresponding to the two desired positions of the adjusting piston.

What I claim is:

1. A ventilation system for storerooms for root crops and similar products, comprising
    a fan means for exhausting air from the room and injecting fresh air into the room;
    a damper mechanism for adjusting the amount of exhausted and injected air to provide recirculation of at least a part of the exhausted air;
    a drive means for operating said damper mechanism;
    a hydraulic thermostat for controlling in a first state the operation of said driving means in dependance on the temperature in the room and maintaining in a second state said damper mechanism in a substantially closed condition, in which injection of fresh air is substantially prevented and recirculation of the exhausted air is established;
    a fluid chamber in said hydraulic thermostat;
    a change-over piston mounted in said fluid chamber to be displaceable between two positions defining a first fluid volume in said chamber corresponding to said first state of the thermostat and a second fluid volume corresponding to said second state of the thermostat, respectively; and
    an external temperature sensor for controlling the position of said change-over piston in dependance on ambient temperature;
    whereby the change-over piston controlled by said sensor assumes one of said positions at ambient temperature below a predetermined value and the other position at ambient temperature above said value.

2. A system as claimed in claim 1, further comprising
    a compressed air or fluid cylinder cooperating with said thermostat;
    an actuation plunger mounted in said cylinder and connected with said change-over piston,
    a compressed air or fluid source for supplying compressed air or fluid to said cylinder;
    a two-way change-over valve connected between said cylinder and said source said valve controlled by said temperature sensor to connect in one of its two positions said source with said cylinder for supplying compressed air or fluid thereto; and
    an exhaust pipe connected to said valve for connecting, in the other position thereof, said cylinder with the ambient.

3. A system as claimed in claim 1, further comprising an adjusting cylinder connected to the hydraulic thermostat for adjusting the operating temperature thereof, said adjusting cylinder also incorporating said fluid chamber.

4. A system claimed in claim 2, wherein the change-over valve is an electromagnetic valve and said temperature sensor is constituted by an electrical sensor connected in the control circuit of said valve.

* * * * *